US010346987B1

(12) United States Patent
Landman

(10) Patent No.: US 10,346,987 B1
(45) Date of Patent: Jul. 9, 2019

(54) LOCATING OBJECTS ON SURFACES

(71) Applicant: Datalogic USA, Inc., Eugene, OR (US)

(72) Inventor: Kevin Landman, Maple Grove, MN (US)

(73) Assignee: Datalogic USA, Inc., Eugene, OR (US)

( * ) Notice: Subject to any disclaimer, the term of this patent is extended or adjusted under 35 U.S.C. 154(b) by 46 days.

(21) Appl. No.: 15/858,719

(22) Filed: Dec. 29, 2017

(51) Int. Cl.
*G06K 9/00* (2006.01)
*G06T 7/136* (2017.01)
*G06T 7/13* (2017.01)

(52) U.S. Cl.
CPC ............ *G06T 7/136* (2017.01); *G06T 7/13* (2017.01); *G06T 2207/10032* (2013.01)

(58) Field of Classification Search
CPC .. G06T 7/136; G06T 7/13; G06T 2207/10032
USPC .......................................... 382/199
See application file for complete search history.

(56) References Cited

U.S. PATENT DOCUMENTS

| 6,871,116 | B2 * | 3/2005 | Brust | B07C 5/10 |
| | | | | 209/566 |
| 9,102,055 | B1 * | 8/2015 | Konolige | B25J 9/163 |
| 9,856,083 | B2 * | 1/2018 | Conrad | B65G 1/0485 |
| 2004/0240754 | A1 * | 12/2004 | Smith | G01B 11/00 |
| | | | | 382/286 |
| 2014/0232826 | A1 * | 8/2014 | Halata | B66F 9/0755 |
| | | | | 348/46 |
| 2017/0246744 | A1 * | 8/2017 | Chitta | B25J 9/1687 |

OTHER PUBLICATIONS

Gradient Vector Griding: An Approach to Shape-Based Object Detection in RoboCup Scenarios; Hamid Moballegh, Naja von Schmude, Raul Rojas; 2011.

* cited by examiner

*Primary Examiner* — Van D Huynh
(74) *Attorney, Agent, or Firm* — Shook, Hardy & Bacon LLP

(57) ABSTRACT

Methods are provided for locating 3D rectangular objects on surfaces, each object having substantially the same X, Y and Z dimensions as the other objects on the surface. An image of a surface having objects arranged thereon is obtained. The image includes pixels arranged in rows and columns. As each object has the same Z-dimension, the surface shown in the image is planar. From the image, the X and Y dimensions, and X, Y coordinates of a center for each object are determined. Edge points are detected utilizing gradient evaluation. The X and Y dimensions of the objects are determined by counting the frequency of distances between edge points and X, Y coordinates of the center location for each object is determined by identifying positions in the image that have a concentration of edge points at a distance equivalent to one-half the size (X or Y dimension) of the objects.

20 Claims, 6 Drawing Sheets

US 10,346,987 B1

LOCATING OBJECTS ON SURFACES

CROSS-REFERENCE TO RELATED APPLICATIONS

None.

BACKGROUND

Automated warehousing of products continues to be of importance to maintain efficiencies for physical product providers. Automated storage, retrieval, handling, and distribution of physical goods save time and expense for product providers, particularly as the volume of goods or products increases. Means for identifying the location of goods, for instance on a pallet, for de-palletizing and other similar functions, however, often are fraught with difficulties.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer-readable storage media are provided for locating three-dimensional (3D) rectangular objects on surfaces. More particularly, embodiments of the invention are provided for locating 3D rectangular objects (e.g., boxes) arranged on a linear surface, such as a pallet, each of the objects having substantially the same X-dimension, Y-dimension, and Z-dimension as the other objects on the surface (though each of the X-dimension, Y-dimension, and Z-dimension may differ from one another as they pertain to each particular object). An image (e.g., an overhead, two-dimensional (2D) image) of a top surface of a pallet (or other linear surface) having a plurality of 3D rectangular objects arranged thereon is obtained. The image is comprised of a plurality of pixels arranged in a plurality of rows and a plurality of columns. As each of the 3D rectangular objects has substantially the same Z-dimension (or height) as the other 3D rectangular objects arranged on the pallet (or other linear surface), the top surface shown in the image is substantially planar. From the image, the X-dimension, Y-dimension and X, Y coordinates of a center location for each 3D rectangular object arranged on the pallet (or other linear surface) such that they contribute to the substantially planar top surface are determined. To achieve this, the 2D image is analyzed by detecting a plurality of edge points utilizing gradient evaluation. The X-dimension and Y-dimension of the 3D rectangular objects then are determined by counting the frequency of distances between edge points and the X, Y coordinates of the center location for each 3D rectangular object is determined by identifying the positions in the image that have a large number of edge points at a distance equivalent to one-half the size (i.e., the X-dimension or the Y-dimension) of the 3D rectangular objects. Once the size (X and Y dimensions) and center (X, Y coordinates) of the 3D rectangular objects are determined, such information may be provided to, for instance, a computing component configured for facilitating removal of the 3D rectangular objects from the pallet (or other linear surface). In some embodiments, the computing component may be configured for instructing a robotic machine part (or parts) to remove the 3D rectangular objects and place them at another location, for instance, for storing.

BRIEF DESCRIPTION OF THE DRAWINGS

The present invention is illustrated by way of example and not limitation in the accompanying figures in which like reference numerals indicate similar elements and in which.

DETAILED DESCRIPTION

Figure 1:
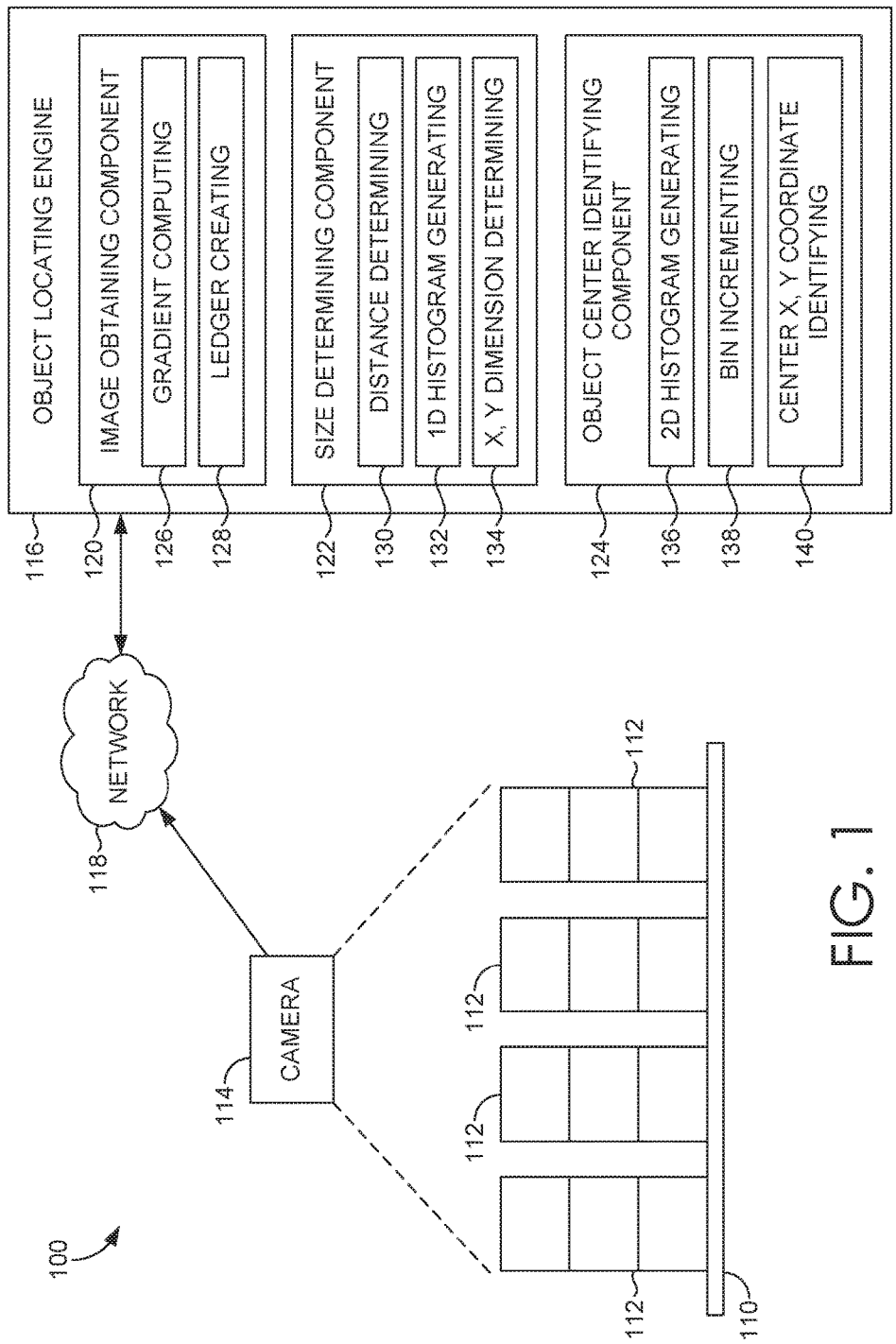
FIG. 1 is a schematic diagram illustrating a high level overview of a system for locating objects on a surface, in accordance with exemplary embodiments of the present disclosure.

The subject matter of aspects of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As previously set forth, automated warehousing of products continues to be of importance to maintain efficiencies for physical product providers. Automated storage, retrieval, handling, and distribution of physical goods save time and expense for product providers, particularly as the volume of goods processed increases. Methods for identifying the location of goods, for instance on a pallet, to facilitate de-palletizing and other warehousing functions, however, have encountered various difficulties. For instance, identifying the location of rectangular objects (e.g., on pallets) has been addressed in the past utilizing line-finding algorithms, such as the Hough transform (known to those having ordinary skill in the art) followed by finding parallel pairs of lines. This approach is complicated, however, when the size of the rectangular objects is unknown. In this situation, it is difficult to determine which line segments are noise and which ones correspond to object edges.

Another proposed approach has been to use corner-finding algorithms, such as the Harris corner detector (known to those having ordinary skill in the art). Again, without knowing the size of the rectangular objects, pairing the corners together to locate objects proves difficult.

Accordingly, some embodiments of the present disclosure are directed to systems, methods, and/or computer-readable storage media for locating three-dimensional (3D) rectangular objects on surfaces, for instance, surfaces utilized in warehouses, such as pallets. More particularly, in embodiments, methods, systems and computer-readable storage media are provided for locating boxes arranged on a pallet, each of the boxes having substantially the same X-dimension, Y-dimension, and Z-dimension as the other boxes on the pallet (though each of the X-dimension, Y-dimension, and Z-dimension may differ from one another as they pertain to each particular box). In some embodiments, pallets may have boxes arranged in a plurality of layers. An image (e.g., an overhead, two-dimensional (2D) image) of a top surface of a pallet having a plurality of 3D rectangular boxes arranged thereon is obtained. The image is comprised of a plurality of pixels arranged in a plurality of rows and a plurality of columns. As each of the 3D rectangular boxes has substantially the same Z-dimension (or height) as the other 3D rectangular boxes on the pallet, the top surface shown in the image is substantially planar. (As used herein, the term "substantially" refers to any value differing by not more than 5%.) From the image, the X-dimension, Y-dimension and X, Y coordinates of a center location for each 3D rectangular box arranged on the pallet such that they contribute to the substantially planar top surface are determined. To achieve this, the 2D image is analyzed by detecting a plurality of edge points utilizing horizontal and vertical gradient evaluation. The X-dimension and Y-dimension of the 3D rectangular boxes then are determined by counting the frequency of distances between edge points and the X, Y coordinates of the center location for each 3D rectangular box is determined by identifying the positions in the image that have a relatively large number of edge points at a distance equivalent to one-half the size (i.e., the X-dimension or the Y-dimension) of the 3D rectangular boxes. Once the size (X and Y dimensions) and center (X, Y coordinates) of the 3D rectangular boxes are determined, such information may be provided to, for instance, a computing component configured for facilitating removal of the 3D rectangular boxes from the pallet. In some embodiments, the computing component may be configured for instructing a robotic machine part (or parts) to remove the 3D rectangular boxes and place them at another location, for instance, for storing.

Accordingly, exemplary embodiments are directed to methods performed by one or more computing devices including at least one processor, the methods for locating objects on surfaces. In some embodiments, the method comprises obtaining an image (for instance, a 2D, overhead image) showing multiple 3D rectangular objects arranged on a surface and collectively providing a substantially planar top surface. The image includes a plurality of pixels arranged in a plurality of rows and a plurality of columns. Each 3D rectangular object has substantially the same X, Y, and Z dimensions as the other 3D rectangular objects (though each of the X, Y, and Z dimensions may differ from one another as they pertain to each particular 3D rectangular object). The method further comprises, from the image, determining the X-dimension, the Y-dimension, and the X, Y coordinates of a center location for each of the multiple 3D rectangular objects shown in the image. To determine the X-dimension, Y-dimension and X, Y coordinates of the center location for each 3D rectangular object, a plurality of edge points comprising the multiple 3D rectangular objects shown in the image is detected via gradient evaluation. For each row of pixels in the image, a frequency of distances between edge points of a first portion of the plurality of edge points is incremented to determine the X-dimension for each 3D rectangular object shown in the image. Similarly, for each column of pixels in the image, a frequency of distances between edge points of a second portion of the plurality of edge points is incremented to determine the Y-dimension for each 3D rectangular object shown in the image. One or more positions are identified in the image having a concentration of edge points located at a distance equivalent to one-half of the X-dimension of each 3D rectangular object shown in the image or one-half of the Y-dimension of each 3D rectangular object shown in the image. At least a portion of the one or more positions corresponds to the X, Y coordinates of the center location for each of the multiple 3D rectangular objects shown in the image.

Other exemplary embodiments are directed to one or more non-transitory computer storage media storing computer-useable instructions that, when used by at least one computing device, cause the at least one computing device to perform a method for locating boxes arranged in a plurality of layers on a pallet, each of the boxes having substantially equivalent X, Y, and Z dimensions as the other boxes (though each of the X, Y, and Z dimensions may differ from one another as they pertain to each particular box). The method comprises obtaining a two-dimensional, overhead image of the pallet, the image having a plurality of pixels arranged in rows and columns and showing a top layer of boxes of the plurality of layers of boxes. The method further comprises detecting a plurality of edge points for the boxes comprising the top layer of boxes via horizontal and vertical gradient evaluation. For each row of pixels in the image, the method further comprises incrementing a frequency of distances between edge points of a first portion of the plurality of edge points to determine the X-dimension for each box comprising the top layer of boxes, and for each column of pixels in the image, incrementing a frequency of distances between edge points of a second portion of the plurality of edge points to determine the Y-dimension for each box comprising the top layer of boxes. Still further, the exemplary methods comprise identifying one or more positions in the image having a concentration of edge points located at a distance equivalent to one-half of the X-dimension of each box comprising the top layer of boxes or one-half of the Y-dimension of each box comprising the top layer of boxes. At least a portion of the one or more positions corresponds to the X, Y coordinates of the center location for each box comprising the top layer of boxes.

Still other exemplary embodiments are directed to methods for locating boxes arranged in a plurality of layers on a pallet, each of the boxes having substantially equivalent X, Y, and Z dimensions as the other boxes on the pallet (though each of the X, Y, and Z dimensions may differ from one another as they pertain to each particular box). The method comprises obtaining a two-dimensional, overhead image of the pallet, the image having a plurality of pixels arranged in rows and columns and showing a top layer of boxes of the plurality of layers of boxes. The boxes of the top layer of boxes collectively provide a substantially planar top surface. The method further comprises detecting a plurality of edge points for the boxes comprising the top layer of boxes via horizontal and vertical gradient evaluation. For each row of pixels in the image, the method additionally comprises incrementing a frequency of distances between edge points of a first portion of the plurality of edge points to determine the X-dimension for each box comprising the top layer of boxes. Similarly, for each column of pixels in the image, the method comprises incrementing a frequency of distances between edge points of a second portion of the plurality of edge points to determine the Y-dimension for each box comprising the top layer of boxes. Still further, the method comprises identifying one or more positions in the image having a concentration of edge points located at a distance equivalent to one-half of the X-dimension of each box comprising the top layer of boxes or one-half of the Y-dimension of each box comprising the top layer of boxes. At least a portion of the positions correspond to the X, Y coordinates of the center location for each box comprising the top layer of boxes.

Turning now to FIG. 1, a schematic depiction is provided illustrating an exemplary system 100 in which some embodiments of the present disclosure can be employed. Generally, the system 100 illustrates an environment in which 3D rectangular objects arranged on substantially planar surfaces may be located. Among other components not shown, the system 100 generally includes a substantially planar surface 110 (e.g., a pallet or platform) having a plurality of 3D rectangular objects 112 (e.g., boxes) arranged thereon. In some embodiments, the 3D rectangular objects 112 may be arranged in a plurality of layers, as shown. The 3D rectangular objects 112 have substantially equivalent X, Y and Z dimensions relative to one another, though the X, Y and Z dimensions may be different as they pertain to a single object. Thus, when arranged in layers as shown, the 3D rectangular objects 112 provide a substantially planar top surface. The system 100 further includes a camera 114 configured for capturing images (e.g., two-dimensional, overhead images) of the top surface of the 3D rectangular objects as they are arranged on the surface 110. The system 100 further includes an object locating engine 116 and a network 118. The network 118 is in communication with both the camera 114 and the object locating engine 118. The network 118 may include, without limitation, one or more local area networks (LANs) and/or wide area networks (WANs). Such networking environments are commonplace in offices, enterprise-wide computer networks, intranets and the Internet. Accordingly, the network 118 is not further described herein.

In some aspects, one or more of the illustrated components/modules may be implemented as stand-alone applications. In other aspects, one or more of the illustrated components/modules may be implemented via the object locating engine 116 or as an Internet-based service. It will be understood by those of ordinary skill in the art that the components/modules illustrated in FIG. 1 are exemplary in nature and in number and should not be construed as limiting. Any number of components/modules may be employed to achieve the desired functionality within the scope of embodiments hereof. Further, it should be understood that any number of cameras 114 and/or object locating engines 116 may be employed in the computing system 100 within the scope of embodiments of the present disclosure. Each may comprise a single device/interface or multiple devices/interfaces cooperating in a distributed environment. For instance, the object locating engine 116 may comprise one or more cameras 114 and/or a plurality of object locating engines 116 and/or cameras 114 may be configured as a distributed arrangement that collectively provide the functionality of the camera 114 and/or object locating engine 116 described herein. Additionally, other components or modules not shown also may be included within the system 100.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The object locating engine 116 may include any type of computing device, such as the computing device 800 described more fully below with reference to FIG. 8, for example. As illustrated, the object locating engine 116 includes an image obtaining component 120, an edge detecting component 122, an object size determining component 124, and an object center determining or identifying component 126. The image obtaining component 120 is configured to obtain images (for instance, from camera 114 via network 118), the images having a plurality of pixels arranged in a plurality of rows and a plurality of columns. In some embodiments, the image obtaining component is configured to obtain images showing multiple 3D rectangular objects (e.g., boxes) arranged on a surface (e.g., a pallet); wherein the 3D rectangular objects shown in the image collectively provide a substantially planar top surface. In some embodiments, each 3D rectangular object has substantially the same X, Y, and Z dimensions.

The edge detecting component 122 is configured to detect a plurality of edge points comprising the multiple 3D rectangular objects (e.g., boxes) shown in an image (obtained by the image obtaining component 120) via gradient evaluation. The edge detecting component 122 comprises a gradient computing component 128 and a ledger creating component 130. The edge detecting component 122 is configured to compute an X-direction gradient for each pixel in each row of pixels in the obtained image. The edge detecting component 122 further is configured to compute a Y-direction gradient for each pixel in each column of pixels in the obtained image. The ledger creating component 130 is configured to create a list or ledger comprising a plurality of ledger entries. The ledger comprises a ledger entry for each pixel for which the X-direction gradient (determined by the gradient computing component 128) exceeds a threshold value (which may be standard or user-defined), as well as a ledger entry for each pixel for which the Y-direction gradient (also determined by the gradient computing component 128) exceeds the threshold value. In the first instance, the ledger entry includes a location (expressed as a pair of X, Y coordinates) of a particular pixel for which the X-direction gradient exceeds the threshold value and a gradient sign (positive (+) or negative (−)) associated with the particular pixel. In the second instance, the ledger entry includes a location (expressed as a pair of X, Y coordinates) of a particular pixel for which the Y-direction gradient exceeds the threshold value and a gradient sign associated with the particular pixel. Each pixel having a ledger entry comprises an edge point of the plurality of edge points.

Figure 2:
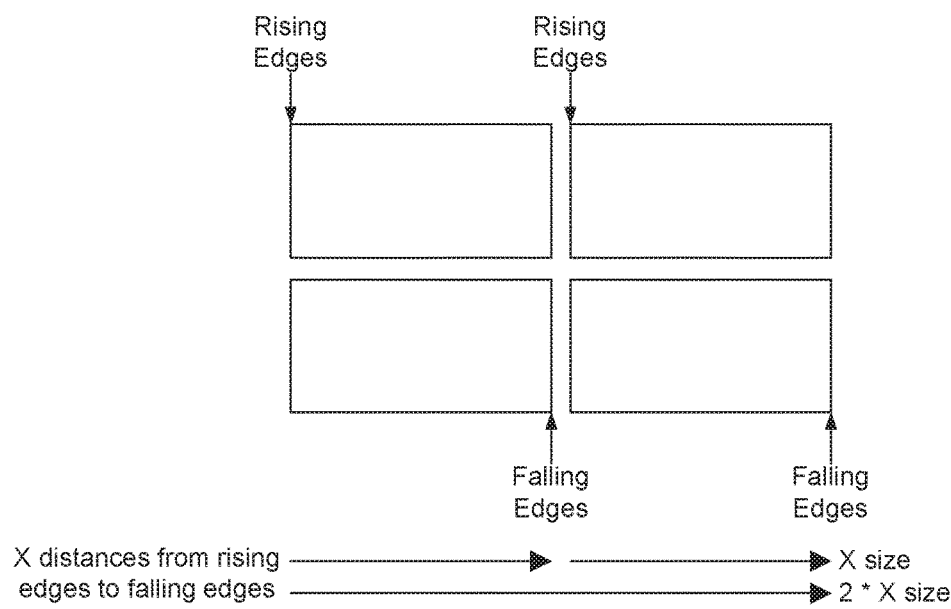
FIG. 2 is a schematic diagram illustrating rising and falling edges of objects on a surface, in accordance with exemplary embodiments of the present disclosure.

The gradient sign associated with each pixel having a ledger entry is indicative of one of a rising gradient and a falling gradient. A pixel having a rising gradient is indicative of a rising or positive edge of an object. A pixel having a falling gradient is indicative of a falling or negative edge of an object. Rising and falling edges are occasioned by a gap, no matter how small, between objects. A rising edge also is occasioned by an outer edge of the plurality of objects arranged on a surface at the beginning of the gradient reading. For instance, if examining the gradient from left to right, the beginning of the gradient reading is the left-most rising edge. The opposite is true for falling edges. That is, a falling edge is occasioned by an outer edge of the plurality of objects arranged on a surface at the end of the gradient reading. For instance, if examining the gradient from left to right, the end of the grading reading is the right-most falling edge. Similarly, rising and falling edges are occasioned by gaps in vertical (or Y-direction) gradient readings as well, as are beginning rising and ending falling edges, for instance, when reading a grading from top to bottom. FIG. 2 illustrates both rising and falling edges as each pertains to an image showing a top surface of a plurality of equivalently-sized rectangular objects.

The object size determining component 124 is configured to determine an X-dimension and a Y-dimension for the 3D rectangular objects shown in an image (e.g., an image obtained by the image obtaining component 120 through network 118 from camera 114). The object size determining component 124 is configured to, for each row of pixels in the image, increment a frequency of distances between edge points of a first portion of the plurality of edge points to determine the X-dimension for each 3D rectangular object shown in the image, and for each column of pixels in the image, increment a frequency of distances between edge points of a second portion of the plurality of edge points to determine the Y-dimension for each 3D rectangular object shown in the image.

As illustrated, the object size determining component 124 includes an edge-point-distance determining component 132, a one-dimensional histogram generating component 134 and an X, Y dimension determining component 136. The edge-point-distance determining component 132 is configured, for each individual pixel in a particular row that has a gradient sign indicative of a rising gradient (i.e., a positive (+) sign), to determine a distance from the individual pixel to each pixel to the right thereof in the X-direction that has a gradient sign indicative of a falling gradient (i.e., a negative (−) sign). The edge-point-distance determining component 132 further is configured, for each individual pixel in a particular column that has a gradient sign indicative of a rising gradient (i.e., a positive (+) sign), to determine a distance from the individual pixel to each pixel below the pixel in the Y-direction that has a gradient sign indicative of a falling gradient (i.e., a negative (−) sign).

Figure 3:
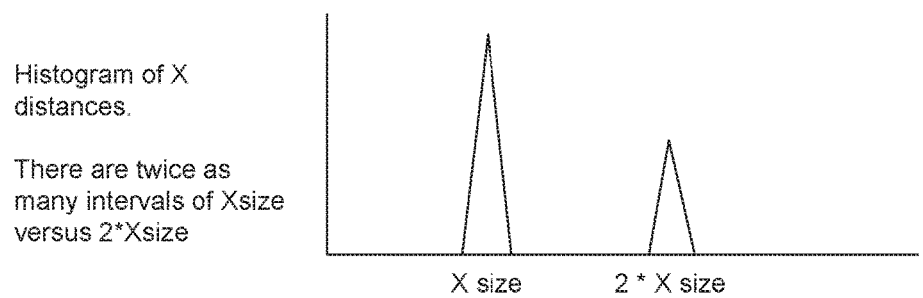
FIG. 3 is a schematic diagram illustrating an exemplary one-dimensional histogram for determining the X-dimension of objects arranged on a surface, in accordance with embodiments of the present disclosure.

The one-dimensional histogram generating component 134 is configured to accumulate the distances determined by the edge-point-distance determining component 132 into a one-dimensional histogram. A one-dimensional histogram pertaining to the 3D rectangular objects shown in FIG. 2 is illustrated in FIG. 3.

The X, Y dimension determining component 136 is configured to examine the one-dimensional histogram and identify any peaks. Peaks identified in the one-dimensional histogram that have the highest peak value are indicative of the X-dimension or the Y-dimension for the 3D rectangular objects shown in the image, depending upon which distance determinations are shown in the histogram. As illustrated in FIG. 2, the distance between a rising edge to the next falling edge in the X-direction represents the X-dimension of the rectangular object. The distance between the first rising edge and the last falling edge in the X-direction is represented as twice the X-dimension, indicating that two rectangular objects are present in the image. This is also illustrated in the histogram of FIG. 3.

With reference back to FIG. 1, the object center identifying component 126 is configured to identify one or more positions in the image having a concentration of edge points located at a distance equivalent to one-half of the X-dimension of each 3D rectangular object shown in the image or equivalent to one-half of the Y-dimension of each 3D rectangular object shown in the image. At least a portion of the one or more positions corresponds to the X, Y coordinates of a center location of one of the 3D rectangular objects shown in the image. As illustrated, the object center identifying component 126 includes a two-dimensional histogram generating component 138, a bin incrementing component 138, and a center X, Y coordinate identifying component 140.

Figure 4:
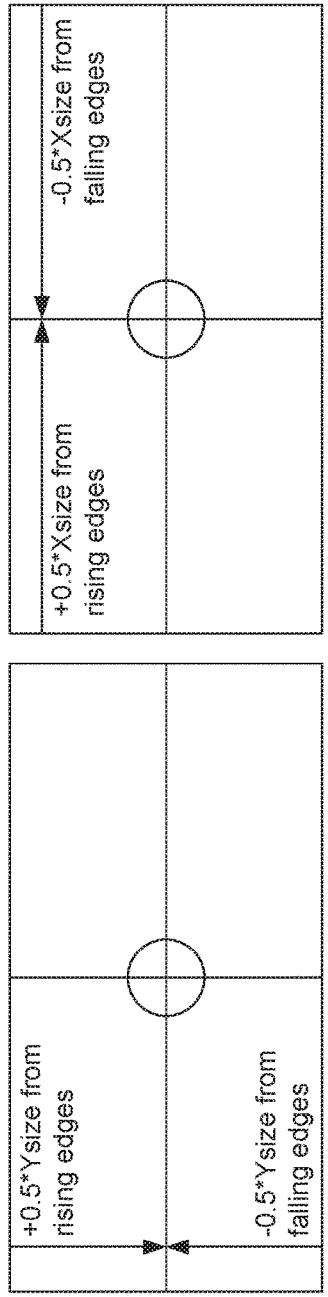
FIG. 4 is a schematic diagram illustrating a methodology for identifying a center location of objects arranged on a surface, in accordance with exemplary embodiments of the present disclosure.

In some embodiments, the two-dimensional histogram generating component 138 is configured to create or generate a two-dimensional histogram having a plurality of bins, each bin corresponding to X, Y coordinates of one of the plurality of pixels comprising an image (e.g., an image obtained by the image obtaining component 120 via the network 118 from the camera 114). The bin incrementing component 140 is configured to, for each pixel in each row of pixels having a ledger entry and a gradient sign indicative of a rising gradient (i.e., a positive (+) sign), increment a count of all bins of the plurality of bins that are located to the right of the particular pixel in the X-direction that have a location at a distance equivalent to one-half of the X-dimension of each 3D rectangular object shown in the image. The bin incrementing component 140 further is configured to, for each pixel in each row of pixels having a ledger entry and a gradient sign indicative of a falling gradient (i.e., a negative (−) sign), increment a count of all bins of the plurality of bins that are located to the left of the particular pixel in the X-direction that have a location at the distance equivalent to one-half of the X-dimension of each 3D rectangular object shown in the image. Still further, the bin incrementing component 140 is configured to, for each pixel in each column of pixels having a ledger entry and a gradient sign indicative of a rising gradient (i.e., a positive (+) sign), increment a count of all bins of the plurality of bins that are located below the pixel in the Y-direction that have a location at a distance equivalent to one-half of the Y-dimension of each 3D rectangular object shown in the image. Additionally, the bin incrementing component 140 is configured to, for each pixel in each column of pixels having a ledger entry and a gradient sign indicative of a falling gradient (i.e., a negative (−) sign), increment a count of all bins of the plurality of bins that are located above the pixel in the Y-direction that have a location at the distance equivalent to one-half of the Y-dimension of each 3D rectangular object shown in the image. This is illustrated in FIG. 4.

The center X, Y coordinate identifying component 142 is configured to identify peaks in the two-dimensional histogram, the highest peak values corresponding to the X, Y coordinates of a center location of one of the multiple three-dimensional rectangular objects shown in an obtained image. In embodiments, the center X, Y coordinate identifying component 142 (or another component, not shown) may be configured to provide the X-dimensions, Y-dimensions, and X, Y coordinates of the center locations for the multiple 3D rectangular objects 112 shown in an image to a computing component (not shown) configured to facilitate removal of the 3D rectangular objects 112 from the surface 110.

Figure 5:
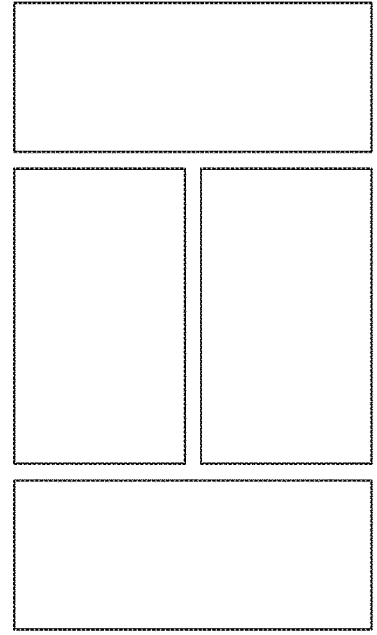
FIG. 5 is a schematic diagram illustrating a special case scenario in which objects arranged on a surface are arranged in differing orientations, in accordance with exemplary embodiments of the present disclosure.

In some embodiments, not all 3D rectangular objects on a surface may be oriented in the same way. For instance, as shown in FIG. 5, 3D rectangular objects having the same X, Y and Z dimensions as one another may be positioned differently (e.g., rotated 90 degrees) on a surface and yet still provide a substantially planar top surface. In this instance, The X-dimension of some objects will correspond to the Y-dimension of other objects and vice versa. In such instances, the center location of the objects may be incorrectly determined. If a threshold is not correctly reached, embodiments hereof invert the X size and Y size in an attempt to meet the appropriate thresholds and identify the rotated objects.

For example, in the orientation illustrated in FIG. 5, the X-dimension histogram and the Y-dimension histogram will have the highest peak at the smaller dimension. Thus, embodiments of the present disclosure contemplate an additional step to validate the X-dimension and Y-dimension against the total pallet area. That is, if the X-dimension is equal to the Y-dimension then the boxes are square and the X-dimension multiplied by a number of X-dimension segments in the X-dimension peaks should equal to total palette area. If that test fails, then there must be a second, lower peak in both the X-dimension histogram and the Y-dimension histogram that corresponds to the other dimension, that is, the Y-dimension. Then it should be that the X-dimension multiplied by the count of segments in the X-dimension peak plus the Y-dimension multiplied by a count of segments in the Y-dimension peak should equal the total palette area.

In some embodiments, the orientation of the 3D rectangular objects on the linear surface for which an image may be obtained that is sufficiently aligned with the pixel array such that de-skewing of the image direction is not necessary. However, in some embodiments, an obtained image may not be properly aligned with the pixel array. In such instances, a de-skewing step may be utilized, within embodiments hereof, to measure the orientation of the linear surface and rotate the obtained image into alignment with the pixel array. If the objects are not all of the same size or not all oriented at the same angle, methods of embodiments hereof will locate only a subset of the 3D rectangular objects, that is, the largest subset in which all of the 3D rectangular objects are of the same size and same orientation. If preliminary image orientation is necessary, the first edge point on each row (or each column) of pixels, which together comprise an outer edge of the pallet (or other linear surface), may be collected and a least-squares fit to a line may be performed. The image then may be rotated to align the pallet edge to the image X (or Y) axis.

Figure 6:
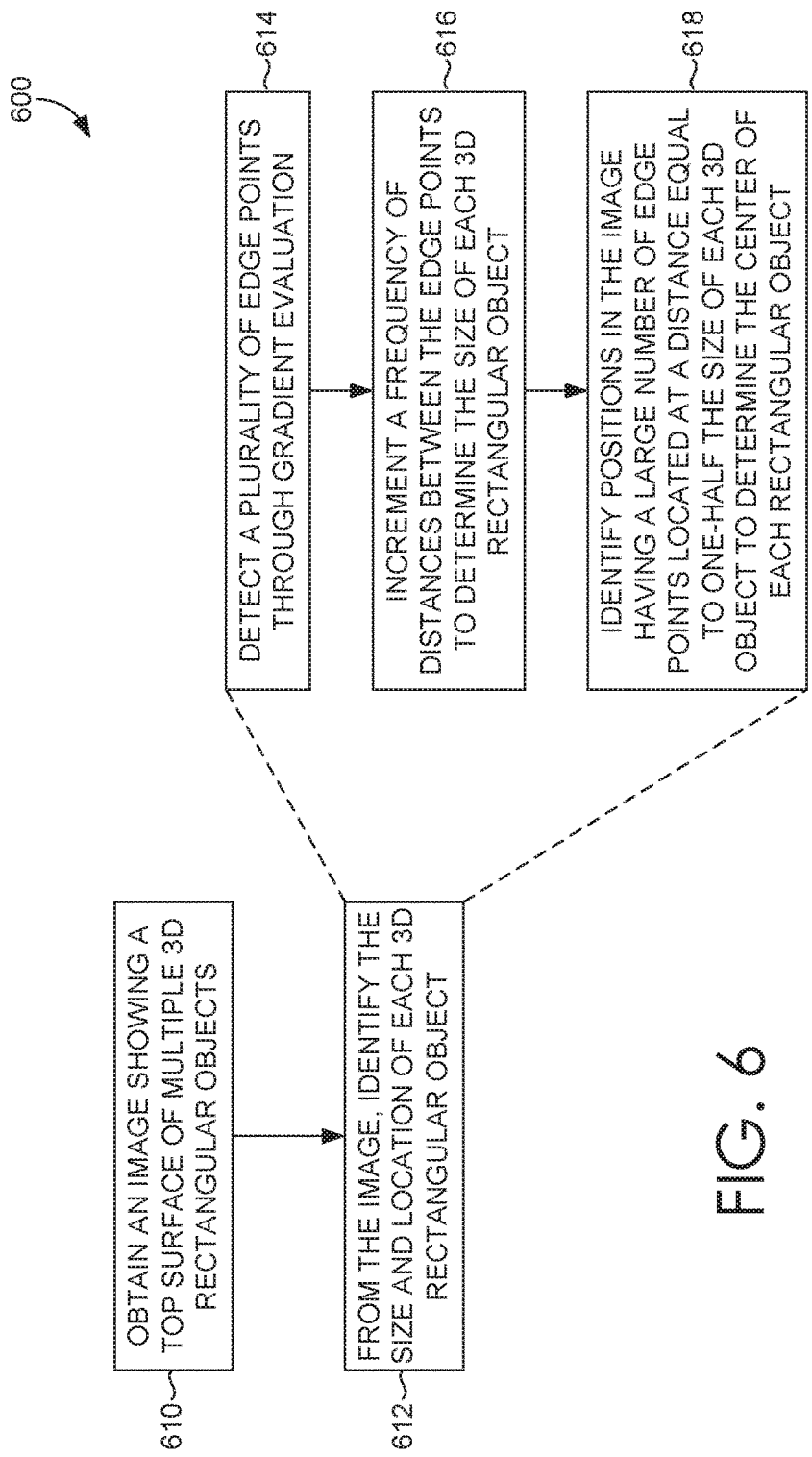
FIG. 6 is a schematic diagram illustrating an exemplary method for locating objects arranged on a surface, in accordance with exemplary embodiments of the present disclosure.

With reference now to FIG. 6, illustrated is a schematic diagram showing an exemplary method 600 for locating objects arranged on a surface, in accordance with exemplary embodiments of the present disclosure. As shown at block 610, an image is obtained (for instance, via image obtaining component 120 from camera 114 through network 130 of FIG. 1), the image having multiple 3D rectangular objects (e.g., boxes) arranged on a surface (e.g., a pallet) and collectively providing a substantially planar top surface. In some embodiments, the image may include a plurality of pixels arranged in a plurality of rows and a plurality of columns. In some embodiments, each 3D object has substantially the same X, Y, and Z dimensions as other 3D rectangular objects arranged on the surface.

As shown at block 612, from the image, the size (X-dimension and Y-dimension) and the center location (represented as X, Y coordinates) for each of the multiple 3D rectangular objects is determined and/or identified. In some embodiments, the size and center location for each object may be determined as set forth in block 614, 616 and 618. Initially, as shown at block 614, a plurality of edge points that collectively comprise the multiple 3D rectangular objects shown in the image may be detected via horizontal and vertical gradient evaluation. In some embodiments, horizontal gradient evaluation may comprise, for each row of pixels in the image, computing an X-direction gradient for each pixel in the row and creating a ledger comprising an entry for each pixel for which the X-direction gradient exceeds a threshold value. Each ledger entry may include a location of a particular pixel for which the X-direction gradient exceeds the threshold value and a gradient sign (positive (+) or negative (−)) associated with the particular pixel. Each pixel having a ledger entry may comprise an edge point of the plurality of edge points. In some embodiments, vertical gradient evaluation similarly may comprise, for each column of pixels in the image, computing a Y-direction gradient for each pixel in the column and creating a ledger comprising an entry for each pixel for which the Y-direction gradient exceeds a threshold value. Each ledger entry may include a location of a particular pixel for which the Y-direction gradient exceeds the threshold value and a gradient sign (positive (+) or negative (−)) associated with the particular pixel. Each pixel having a ledger entry may comprise an edge point of the plurality of edge points. In some embodiments, the gradient sign associated with each pixel having a ledger entry is indicative of one of a rising gradient (i.e., a positive (+) sign) and a falling gradient (i.e., a negative (−) sign).

As shown at block 616, a frequency of distances between edge points may be incremented to determine the size of each 3D rectangular object shown in the image. In embodiments, for each row of pixels in the image, a frequency of distances between edge points of a first portion of the plurality of edge points may be incremented to determine the X-dimension for each 3D rectangular object shown in the image and for each column of pixels in the image, a frequency of distances between edge points may be incremented to determine the Y-dimension for each 3D rectangular object shown in the image.

In some embodiments, incrementing a frequency of distances between edge points of a first portion of the plurality of edge points to determine the X-dimension for each 3D rectangular object shown in the image may include, for each individual pixel in a particular row that has a gradient sign indicative of a rising gradient (i.e., a positive (+) sign): (1) determining a distance from the individual pixel to each pixel to the right thereof in the X-direction that has a gradient sign indicative of a falling gradient (i.e., a negative (−) sign); (2) accumulating the distances in a one-dimensional histogram; and (3) identifying a highest peak value in the one-dimensional histogram, the highest peak value being indicative of the X-dimension for the 3D rectangular objections shown in the image. In some embodiments, incrementing a frequency of distances between edge points of a first portion of the plurality of edge points to determine the Y-dimension for each 3D rectangular object shown in the image similarly may include, for each individual pixel in a particular column that has a gradient sign indicative of a rising gradient (i.e., a positive (+) sign): (1) determining a distance from the individual pixel to each pixel below the pixel in the Y-direction that has a gradient sign indicative of a falling gradient (i.e., a negative (−) sign); (2) accumulating the distances in a one-dimensional histogram; and (3) identifying a highest peak value in the one-dimensional histogram, the highest peak value being indicative of the Y-dimension for the 3D rectangular objections shown in the image.

As shown at block 618, positions in the image having a large number of edge points located at a distance equal to one-half the size of each 3D object may be identified to determine the center location (expressed as X, Y coordinates) of each rectangular object. In embodiments, positions may be determined by identifying one or more positions in the image having a concentration of edge points located at a distance equivalent to one-half of the X-dimension of each 3D rectangular object shown in the image or equivalent to one-half of the Y-dimension of each 3D rectangular object shown in the image. At least a portion of the one or more positions may correspond to the X, Y coordinates of a center location of one of the multiple 3D rectangular objects shown in the image.

In some embodiments, identifying one or more positions in the image having a concentration of edge points located at a distance equivalent to one-half of the X-dimension of each 3D rectangular object shown in the image or equivalent to one-half of the Y-dimension of each 3D rectangular object shown in the image comprises: (1) creating a two-dimensional histogram having a plurality of bins, each bin corresponding to X,Y coordinates of one of the plurality of pixels comprising the image; (2) for each pixel in each row of pixels having a ledger entry and a gradient sign indicative of a rising gradient (i.e., a positive (+) sign), incrementing a count of all bins of the plurality of bins that are located to the right of the particular pixel in the X-direction that have a location at a distance equivalent to one-half of the X-dimension of each 3D rectangular object shown in the image; (3) for each pixel in each row of pixels having a ledger entry and a gradient sign indicative of a falling gradient (i.e., a negative (−) sign), incrementing a count of all bins of the plurality of bins that are located to the left of the particular pixel in the X-direction that have a location at the distance equivalent to one-half of the X-dimension of each 3D rectangular object shown in the image; (4) for each pixel in each column of pixels having a ledger entry and a gradient sign indicative of a rising gradient (i.e., a positive (+) sign), incrementing a count of all bins of the plurality of bins that are located below the pixel in the Y-direction that have a location at a distance equivalent to one-half of the Y-dimension of each 3D rectangular object shown in the image; and (5) for each pixel in each column of pixels having a ledger entry and a gradient sign indicative of a falling gradient (i.e., a negative (−) sign), incrementing a count of all bins of the plurality of bins that are located above the pixel in the Y-direction that have a location at the distance equivalent to one-half of the Y-dimension of each 3D rectangular object shown in the image. Each peak in the two-dimensional histogram that exceeds a threshold height corresponds to X, Y coordinates of a center location of one of the multiple 3D rectangular objects shown in the image.

Figure 7:
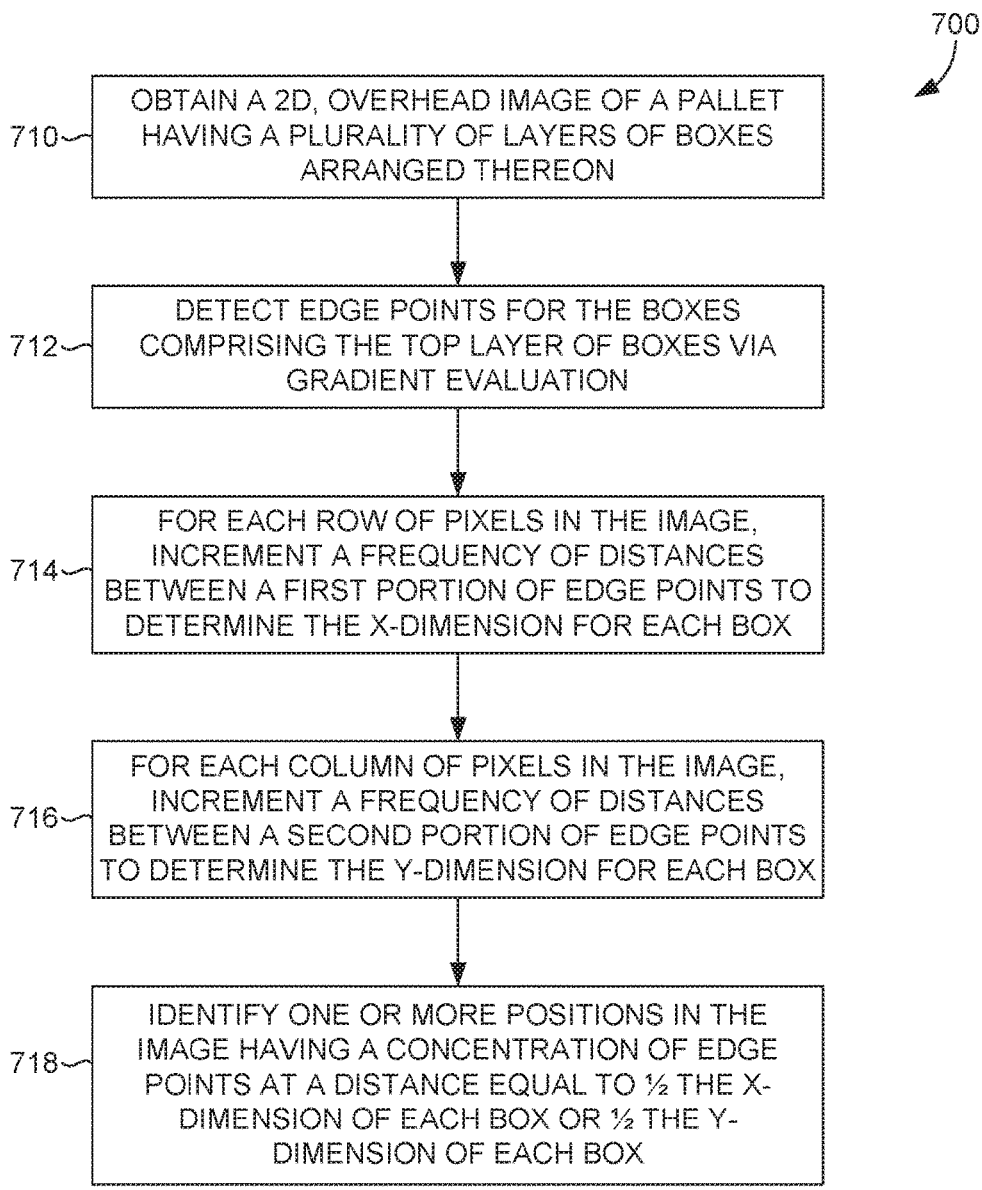
FIG. 7 is a schematic diagram illustrating an exemplary method for locating boxes arranged in a plurality of layers on a pallet, in accordance with exemplary embodiments of the present disclosure.

Turning now to FIG. 7, illustrated is a schematic diagram showing an exemplary method for locating boxes arranged in a plurality of layers on a pallet, each of the boxes having substantially equivalent X, Y and Z dimensions as other boxes arranged on the pallet, in accordance with exemplary embodiments of the present disclosure. As shown at block 710, a two-dimensional, overhead image of a pallet (for instance, for use in warehousing physical products) having a plurality of layers of boxes arranged thereon is obtained (e.g., via image obtaining component 120 from camera 114 through network 130 of FIG. 1). In some embodiments, the image has a plurality of pixels arranged in rows and columns and shows a top layer of boxes of the plurality of layers of boxes.

As shown at block 712, edge points for the boxes comprising the top layer of boxes is detected via horizontal and vertical gradient evaluation. In some embodiments, horizontal gradient evaluation may comprise, for each row of pixels in the image, computing an X-direction gradient for each pixel in the row and creating a ledger comprising an entry for each pixel for which the X-direction gradient exceeds a threshold value. Each ledger entry may include a location of a particular pixel for which the X-direction gradient exceeds the threshold value and a gradient sign (i.e., a positive (+) or a negative (−) sign) associated with the particular pixel. Each pixel having a ledger entry may comprise an edge point of the plurality of edge points. In some embodiments, vertical gradient evaluation similarly may comprise, for each column of pixels in the image, computing a Y-direction gradient for each pixel in the column and creating a ledger comprising an entry for each pixel for which the Y-direction gradient exceeds a threshold value. Each ledger entry may include a location of a particular pixel for which the Y-direction gradient exceeds the threshold value and a gradient sign (i.e., a positive (+) or a negative (−) sign) associated with the particular pixel. Each pixel having a ledger entry may comprise an edge point of the plurality of edge points. In some embodiments, the gradient sign associated with each pixel having a ledger entry is indicative of one of a rising gradient (i.e., a positive (+) sign) and a falling gradient (i.e., a negative (−) sign).

As shown at block 714, for each row of pixels in the image, a frequency of distances between edge points of a first portion of the plurality of edge points is incremented to determine the X-dimension for each box comprising the top layer of boxes. In some embodiments, incrementing a frequency of distances between edge points of a first portion of the plurality of edge points to determine the X-dimension for each box comprising the top layer of boxes may include, for each individual pixel in a particular row that has a gradient sign indicative of a rising gradient (i.e., a positive (+) sign): (1) determining a distance from the individual pixel to each pixel to the right thereof in the X-direction that has a gradient sign indicative of a falling gradient (i.e., a negative (−) sign); (2) accumulating the distances in a one-dimensional histogram; and (3) identifying a highest peak value in the one-dimensional histogram, the highest peak value being indicative of the X-dimension for each box comprising the top layer of boxes.

As shown at block 716, for each column of pixels in the image, a frequency of distances between a second portion of the plurality of edge points is incremented to determine the Y-dimension for each box comprising the top layer of boxes. In some embodiments, incrementing a frequency of distances between a second portion of the plurality of edge points to determine the Y-dimension for each box comprising the top layer of boxes may include, for each individual pixel in a particular column that has a gradient sign indicative of a rising gradient (i.e., a positive (+) sign): (1) determining a distance from the individual pixel to each pixel below the pixel in the Y-direction that has a gradient sign indicative of a falling gradient (i.e., a negative (−) sign); (2) accumulating the distances in a one-dimensional histogram; and (3) identifying a highest peak value in the one-dimensional histogram, the highest peak value being indicative of the Y-dimension for each box comprising the top layer of boxes.

As shown at block 718, one or more positions in the image are identified that have a concentration of edge points at a distance equal to one-half the X-dimension of each box comprising the top layer of boxes or equal to one-half the Y-dimension of each box. In some embodiments, identifying one or more first in the image having a concentration of edge points located at a distance equivalent to one-half of the X-dimension of each box comprising the top layer of boxes or one-half of the Y-dimension of each box comprising the top layer of boxes comprises: (1) creating a two-dimensional histogram having a plurality of bins, each bin corresponding to X,Y coordinates of one of the plurality of pixels comprising the image; (2) for each particular pixel in each row of pixels having a ledger entry and a gradient sign indicative of a rising gradient (i.e., a positive (+) sign), incrementing a count of all bins of the plurality of bins that are located to the right of the particular pixel in the X-direction that have a location at a distance equivalent to one-half of the X-dimension of each box comprising the top layer of boxes; (3) for each particular pixel in each row of pixels having a ledger entry and a gradient sign indicative of a falling gradient (i.e., a negative (−) sign), incrementing a count of all bins of the plurality of bins that are located to the left of the particular pixel in the X-direction that have a location at the distance equivalent to one-half of the X-dimension of each box comprising the top layer of boxes; (4) for each particular pixel in each column of pixels having a ledger entry and a gradient sign indicative of a rising gradient (i.e., a positive (+) sign), incrementing a count of all bins of the plurality of bins that are located below the particular pixel in the Y-direction that have a location at a distance equivalent to one-half of the Y-dimension of each box comprising the top layer of boxes; and (5) for each particular pixel in each column of pixels having a ledger entry and a gradient sign indicative of a falling gradient (i.e., a negative (−) sign), incrementing a count of all bins of the plurality of bins that are located above the particular pixel in the Y-direction that have a location at the distance equivalent to one-half of the Y-dimension of each box comprising the top layer of boxes. Each peak in the two-dimensional histogram that exceeds a threshold height corresponds to X, Y coordinates of a center location of one of the boxes comprising the top layer of boxes.

Exemplary Operating Environment

Having briefly described an overview of embodiments of the present invention, an exemplary operating environment in which embodiments of the present invention may be implemented is described below in order to provide a general context for various aspects of the present invention. Referring to FIG. 8, an exemplary operating environment for implementing embodiments of the present invention is shown and designated generally as computing device 800. The computing device 800 is but one example of a suitable computing environment and is not intended to suggest any limitation as to the scope of use or functionality of embodiments of the invention. Neither should the computing device 800 be interpreted as having any dependency or requirement relating to any one component nor any combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the invention may be practiced in a variety of system configurations, including, but not limited to, hand-held devices, unattended scanning systems (e.g., laser-based or image-based) consumer electronics, general-purpose computers, more specialty computing devices, and the like. Embodiments of the invention also may be practiced in distributed computing environments where tasks are performed by remote-processing devices that are linked through a communications network.

Figure 8:
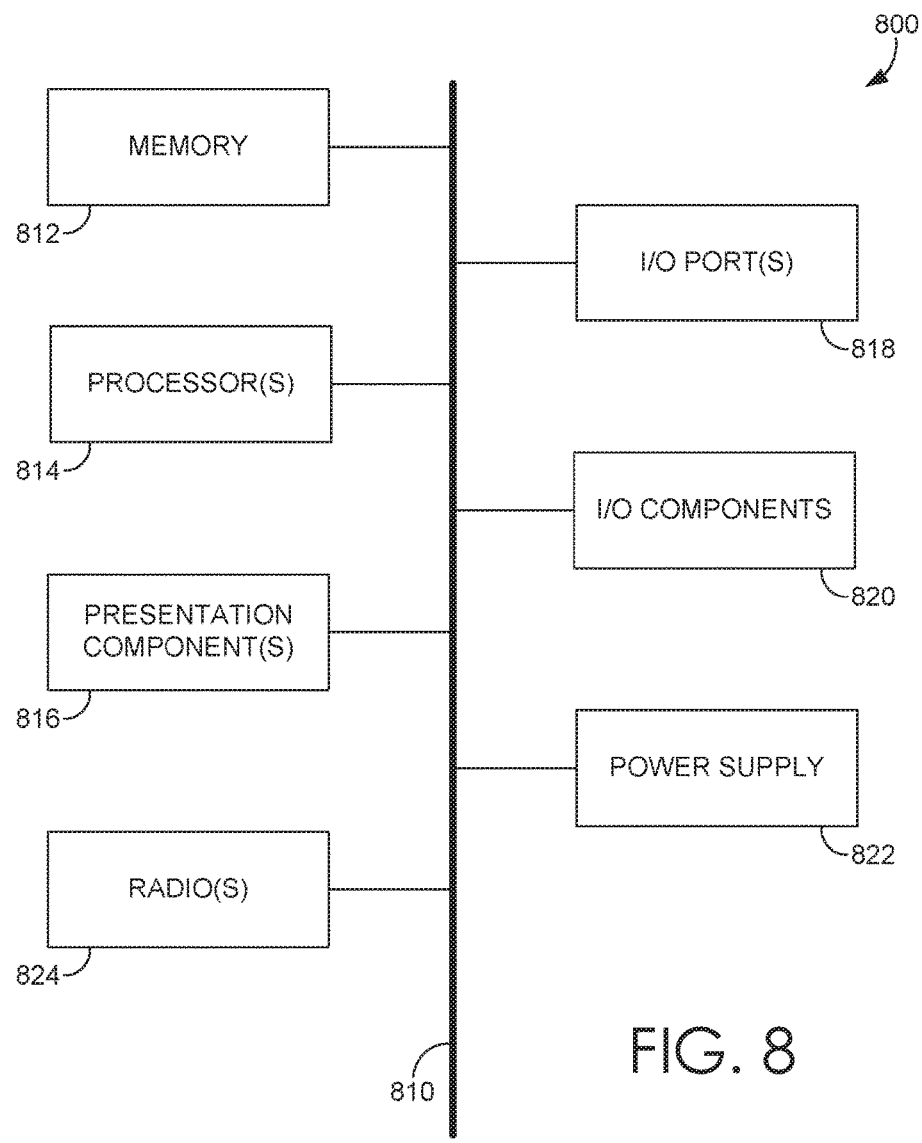
FIG. 8 is a block diagram illustrating an exemplary operating environment in which exemplary embodiments of the present disclosure may be implemented.

With continued reference to FIG. 8, the computing device 800 includes a bus 810 that directly or indirectly couples the following devices: a memory 812, one or more processors 814, one or more presentation components 816, one or more input/output (I/O) ports 818, one or more I/O components 820, and an illustrative power supply 822. The bus 810 represents what may be one or more busses (such as an address bus, data bus, or combination thereof). Although the various blocks of FIG. 8 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

The computing device 800 typically includes a variety of computer-readable media. Computer-readable media may be any available media that is accessible by the computing device 800 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 1100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 812 includes computer-storage media in the form of volatile and/or nonvolatile memory. The memory may be removable, non-removable, or a combination thereof. Exemplary hardware devices include solid-state memory, hard drives, optical-disc drives, and the like. The computing device 800 includes one or more processors that read data from various entities such as the memory 812 or the I/O components 820. The presentation component(s) 816 present data indications to a user or other device. Exemplary presentation components include a display device, speaker, printing component, vibrating component, and the like.

The I/O ports 818 allow the computing device 800 to be logically coupled to other devices including the I/O components 820, some of which may be built in. Illustrative I/O components include a microphone, joystick, game pad, satellite dish, scanner, printer, wireless device, a controller, such as a stylus, a keyboard and a mouse, a natural user interface (NUI), and the like.

A NUI processes air gestures, voice, or other physiological inputs generated by a user. These inputs may be interpreted, for instance, as words or symbols appearing in programs and/or apps, and the like presented by the computing device 800. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as, stereoscopic camera systems, infrared camera systems, RGB camera systems, and combinations of these for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices. The computer-useable instructions form an interface to allow a computer to react according to a source of input. The instructions cooperate with other code segments to initiate a variety of tasks in response to data received in conjunction with the source of the received data.

Exemplary Features Having Multiple Dependencies:

As used herein and in connection with the features listed hereinafter, the terminology "any of features" or similar variations of said terminology is intended to be interpreted such that features may be combined in any combination. For example, an exemplary feature 4 may indicate the method/computer-readable storage medium of any of features 1 through 3, which is intended to be interpreted such that elements of feature 1 and feature 4 may be combined, elements of feature 2 and feature 4 may be combined, elements of feature 3 and feature 4 may be combined, elements of features 1, 2, and 4 may be combined, elements of features 2, 3, and 4 may be combined, elements of features 1, 2, 3, and 4 may be combined, and/or other variations. Further, the terminology "any of features" or similar variations of said terminology is intended to include "any one of features" or other variations of such terminology, as indicated by some of the examples provided above.

Feature 1: A computer-implemented method being performed by one or more computing devices including at least one processor, the method for locating objects arranged on surfaces, the method comprising: (a) obtaining an image, the image having a plurality of pixels arranged in a plurality of rows and a plurality of columns, the image showing multiple three-dimensional (3D) rectangular objects arranged on a surface and collectively providing a substantially planar top surface, each 3D rectangular object having substantially the same X, Y, and Z dimensions as other 3D rectangular objects arranged on the surface; and (b) from the image, determining the X-dimension, the Y-dimension, and X, Y coordinates of a center location for each of the multiple 3D rectangular objects shown in the image by: (1) detecting a plurality of edge points comprising the multiple 3D rectangular objects shown in the image via gradient evaluation; (2) for each row of pixels in the image, incrementing a frequency of distances between edge points of a first portion of the plurality of edge points to determine the X-dimension for each 3D rectangular object shown in the image; (3) for each column of pixels in the image, incrementing a frequency of distances between edge points of a second portion of the plurality of edge points to determine the Y-dimension for each 3D rectangular object shown in the image; and (4) identifying one or more positions in the image having a concentration of edge points located at a distance equivalent to one-half of the X-dimension of each 3D rectangular object shown in the image or one-half of the Y-dimension of each 3D rectangular object shown in the image, at least a portion of the one or more positions corresponding to the X, Y coordinates of a center location of one of the multiple 3D rectangular objects shown in the image.

Feature 2: The computer-implemented method of feature 1, wherein detecting a plurality of edge points comprising the multiple 3D rectangular objects shown in the image via gradient evaluation comprises, for each row of pixels in the image: computing an X-direction gradient for each pixel in the row; and creating a ledger comprising an entry for each pixel for which the X-direction gradient exceeds a threshold value, each ledger entry including a location of a particular pixel for which the X-direction gradient exceeds the threshold value and a gradient sign associated with the particular pixel, wherein each pixel having a ledger entry comprises an edge point of the plurality of edge points.

Feature 3: The computer-implemented method of feature 2, wherein detecting a plurality of edge points comprising the multiple 3D rectangular objects shown in the image via gradient evaluation comprises, for each column of pixels in the image: computing an Y-direction gradient for each pixel in the column; and creating a ledger comprising an entry for each pixel for which the Y-direction gradient exceeds a threshold value, each ledger entry including a location of a particular pixel for which the Y-direction gradient exceeds the threshold value and a gradient sign associated with the particular pixel, wherein each pixel having a ledger entry comprises an edge point of the plurality of edge points.

Feature 4: The computer-implemented method of any features 2 and 3, wherein the gradient sign associated with each pixel having a ledger entry is indicative of one of a rising gradient and a falling gradient.

Feature 5: The computer-implemented method of feature 4, wherein for each row of pixels in the image, incrementing a frequency of distances between edge points of a first portion of the plurality of edge points to determine the X-dimension for each 3D rectangular object shown in the image comprises: for each individual pixel in a particular row that has a gradient sign indicative of a rising gradient, determining a distance from the individual pixel to each pixel to the right thereof in the X-direction that has a gradient sign indicative of a falling gradient; accumulating the distances in a one-dimensional histogram; and identifying a highest peak value in the one-dimensional histogram, the highest peak value being indicative of the X-dimension for the 3D rectangular objects shown in the image.

Feature 6: The computer-implemented method of any of features 4 and 5, wherein for each column of pixels in the image, incrementing a frequency of distances between edge points of a second portion of the plurality of edge points to determine the Y-dimension for each 3D rectangular object shown in the image comprises: for each individual pixel in a particular column that has a gradient sign indicative of a rising gradient, determining a distance from the individual pixel to each pixel below the pixel in the Y-direction that has a gradient sign indicative of a falling gradient; accumulating the distances in a one-dimensional histogram; and identifying a highest peak value in the one-dimensional histogram, the highest peak value being indicative of the Y-dimension for the 3D rectangular objects shown in the image.

Feature 7: The computer-implemented method of feature 6, wherein identifying one or more positions in the image having a concentration of edge points located at a distance equivalent to one-half of the X-dimension of each 3D rectangular object shown in the image or one-half of the Y-dimension of each 3D rectangular object shown in the image comprises: creating a two-dimensional histogram having a plurality of bins, each bin corresponding to X,Y coordinates of one of the plurality of pixels comprising the image; for each pixel in each row of pixels having a ledger entry and a gradient sign indicative of a rising gradient, incrementing a count of all bins of the plurality of bins that are located to the right of the particular pixel in the X-direction that have a location at a distance equivalent to one-half of the X-dimension of each 3D rectangular object shown in the image; for each pixel in each row of pixels having a ledger entry and a gradient sign indicative of a falling gradient, incrementing a count of all bins of the plurality of bins that are located to the left of the particular pixel in the X-direction that have a location at the distance equivalent to one-half of the X-dimension of each 3D rectangular object shown in the image; for each pixel in each column of pixels having a ledger entry and a gradient sign indicative of a rising gradient, incrementing a count of all bins of the plurality of bins that are located below the pixel in the Y-direction that have a location at a distance equivalent to one-half of the Y-dimension of each 3D rectangular object shown in the image; and for each pixel in each column of pixels having a ledger entry and a gradient sign indicative of a falling gradient, incrementing a count of all bins of the plurality of bins that are located above the pixel in the Y-direction that have a location at the distance equivalent to one-half of the Y-dimension of each 3D rectangular object shown in the image, wherein each peak in the two-dimensional histogram that exceeds a threshold height corresponds to X, Y coordinates of a center location of one of the multiple 3D rectangular objects shown in the image.

Feature 8: The computer-implemented method of any of features 1 through 7, further comprising providing the X-dimensions, Y-dimensions, and X, Y coordinates of the center locations for the multiple 3D rectangular objects shown in the image to a computing component configured to facilitate removal of the 3D rectangular objects from the surface.

Feature 9: One or more non-transitory computer storage media storing computer-useable instructions that, when used by at least one computing device, cause the at least one computing device to perform a method or locating boxes arranged in a plurality of layers on a pallet, each of the boxes having substantially equivalent X, Y, and Z dimensions as other boxes arranged on the pallet, the method comprising: obtaining a two-dimensional, overhead image of the pallet, the image having a plurality of pixels arranged in rows and columns and showing a top layer of boxes of the plurality of layers of boxes; detecting a plurality of edge points for the boxes comprising the top layer of boxes via gradient evaluation; for each row of pixels in the image, incrementing a frequency of distances between edge points of a first portion of the plurality of edge points to determine the X-dimension for each box comprising the top layer of boxes; for each column of pixels in the image, incrementing a frequency of distances between edge points of a second portion of the plurality of edge points to determine the Y-dimension for each box comprising the top layer of boxes; and identifying one or more positions in the image having a concentration of edge points located at a distance equivalent to one-half of the X-dimension of each box comprising the top layer of boxes or one-half of the Y-dimension of each box comprising the top layer of boxes, at least a portion of the one or more positions corresponding to the X, Y coordinates of a center location of one of the boxes comprising the top layer of boxes.

Feature 10: The one or more non-transitory computer storage media of feature 9, wherein detecting a plurality of edge points for the boxes comprising the top layer of boxes via gradient evaluation comprises, for each row of pixels in the image: computing an X-direction gradient for each pixel in the row; and creating a ledger comprising an entry for each pixel for which the X-direction gradient exceeds a threshold value, each ledger entry including a location of a particular pixel for which the X-direction gradient exceeds the threshold value and a gradient sign associated with the particular pixel, wherein each pixel having a ledger entry comprises an edge point of the plurality of edge points.

Feature 11: The one or more non-transitory computer storage media of feature 10, wherein detecting a plurality of edge points for the boxes comprising the top layer of boxes via gradient evaluation comprises, for each column of pixels in the image: computing an Y-direction gradient for each pixel in the column; and creating a ledger comprising an entry for each pixel for which the Y-direction gradient exceeds a threshold value, each ledger entry including a location of a particular pixel for which the Y-direction gradient exceeds the threshold value and a gradient sign associated with the particular pixel, wherein each pixel having a ledger entry comprises an edge point of the plurality of edge points.

Feature 12: The one or more non-transitory computer storage media of any of features 10 and 11, wherein the gradient sign associated with each pixel having a ledger entry is indicative of one of a rising gradient and a falling gradient.

Feature 13: The one or more non-transitory computer storage media of feature 12, wherein for each row of pixels in the image, incrementing a frequency of distances between edge points of a first portion of the plurality of edge points to determine the X-dimension for each box comprising the top layer of boxes comprises: for each individual pixel in a particular row that has a gradient sign indicative of a rising gradient, determining a distance from the individual pixel to each pixel to the right thereof in the X-direction that has a gradient sign indicative of a falling gradient; accumulating the distances in a one-dimensional histogram; and identifying a highest peak value in the one-dimensional histogram, the highest peak value being indicative of the X-dimension for each box comprising the top layer of boxes.

Feature 14: The one or more non-transitory computer storage media of feature 12, wherein for each column of pixels in the image, incrementing a frequency of distances between edge points of a second portion of the plurality of edge points to determine the Y-dimension for each box comprising the top layer of boxes: for each individual pixel in a particular column that has a gradient sign indicative of a rising gradient, determining a distance from the individual pixel to each pixel below the pixel in the Y-direction that has a gradient sign indicative of a falling gradient; accumulating the distances in a one-dimensional histogram; and identifying a highest peak value in the one-dimensional histogram, the highest peak value being indicative of the Y-dimension for each box comprising the top layer of boxes.

Feature 15: The one or more non-transitory computer storage media of feature 12, wherein identifying one or more positions in the image having a concentration of edge points located at a distance equivalent to one-half of the X-dimension of each box comprising the top layer of boxes or one-half of the Y-dimension of each box comprising the top layer of boxes comprises: creating a two-dimensional histogram having a plurality of bins, each bin corresponding to X,Y coordinates of one of the plurality of pixels comprising the image; for each particular pixel in each row of pixels having a ledger entry and a gradient sign indicative of a rising gradient, incrementing a count of all bins of the plurality of bins that are located to the right of the particular pixel in the X-direction that have a location at a distance equivalent to one-half of the X-dimension of each box comprising the top layer of boxes; for each particular pixel in each row of pixels having a ledger entry and a gradient sign indicative of a falling gradient, incrementing a count of all bins of the plurality of bins that are located to the left of the particular pixel in the X-direction that have a location at the distance equivalent to one-half of the X-dimension of each box comprising the top layer of boxes, for each particular pixel in each column of pixels having a ledger entry and a gradient sign indicative of a rising gradient, incrementing a count of all bins of the plurality of bins that are located below the particular pixel in the Y-direction that have a location at a distance equivalent to one-half of the Y-dimension of each box comprising the top layer of boxes; and for each particular pixel in each column of pixels having a ledger entry and a gradient sign indicative of a falling gradient, incrementing a count of all bins of the plurality of bins that are located above the particular pixel in the Y-direction that have a location at the distance equivalent to one-half of the Y-dimension of each box comprising the top layer of boxes, wherein each peak in the two-dimensional histogram that exceeds a threshold height corresponds to X,Y coordinates of a center location of one of the boxes comprising the top layer of boxes.

Feature 16: The one or more non-transitory computer storage media of feature 9, wherein the method further comprises providing the X-dimensions, Y-dimensions, and X, Y coordinates of the center locations for each box comprising the top layer of boxes to a computing component configured to facilitate removal of the boxes from the pallet.

Feature 17: A computer-method being performed by one or more computing devices including at least one processor, the method for locating boxes arranged in a plurality of layers on a pallet, each of the boxes having substantially equivalent X, Y, and Z dimensions as other boxes arranged on the pallet, the method comprising: obtaining a two-dimensional, overhead image, the image having a plurality of pixels arranged in rows and columns and showing a top layer of boxes of the plurality of layers of boxes, the boxes of the top layer of boxes collectively providing a substantially planar top surface; detecting a plurality of edge points for the boxes comprising the top layer of boxes via gradient evaluation; for each row of pixels in the image, incrementing a frequency of distances between edge points of a first portion of the plurality of edge points to determine the X-dimension for each box comprising the top layer of boxes; for each column of pixels in the image, incrementing a frequency of distances between edge points of a second portion of the plurality of edge points to determine the Y-dimension for each box comprising the top layer of boxes; and identifying one or more positions in the image having a concentration of edge points located at a distance equivalent to one-half of the X-dimension of each box comprising the top layer of boxes or one-half of the Y-dimension of each box comprising the top layer of boxes, at least a portion of the one or more positions corresponding to the X, Y coordinates of a center location of one of the boxes comprising the top layer of boxes.

Feature 18: The computer-implemented method of feature 17, further comprising providing the X-dimensions, Y-dimensions, and X,Y coordinates of the center locations for each box comprising the top layer of boxes to a computing component configured to facilitate removal of the boxes from the pallet.

As can be understood, embodiments of the present invention provide systems, methods, and computer-readable storage media for, among other things, locating objects (e.g., boxes) on substantially planar surfaces (e.g., pallets). Aspects hereof have been described in relation to particular embodiments, which are intended in all respects to be illustrative rather than restrictive. Alternative embodiments will become apparent to those of ordinary skill in the art to which aspects of the present invention pertain without departing from its scope.

While aspects hereof are susceptible to various modifications and alternative constructions, certain illustrated embodiments are shown in the drawings and have been described above in detail. It should be understood, however, that there is no intention to limit aspects hereof to the specific forms disclosed, but on the contrary, the intention is to cover all modifications, alternative constructions, and equivalents falling within the spirit and scope of aspects of the invention.

What is claimed is:

1. A computer-implemented method being performed by one or more computing devices including at least one processor, the method for locating objects arranged on surfaces, the method comprising:
   (a) obtaining an image, the image having a plurality of pixels arranged in a plurality of rows and a plurality of columns, the image showing multiple three-dimensional (3D) rectangular objects arranged on a surface and collectively providing a substantially planar top surface, each 3D rectangular object having substantially the same X, Y, and Z dimensions as other 3D rectangular objects arranged on the surface; and (b) from the image, determining the X-dimension, the Y-dimension, and X, Y coordinates of a center location for each of the multiple 3D rectangular objects shown in the image by:
  (1) detecting a plurality of edge points comprising the multiple 3D rectangular objects shown in the image via gradient evaluation;
  (2) for each row of pixels in the image, incrementing a frequency of distances between edge points of a first portion of the plurality of edge points to determine the X-dimension for each 3D rectangular object shown in the image;
  (3) for each column of pixels in the image, incrementing a frequency of distances between edge points of a second portion of the plurality of edge points to determine the Y-dimension for each 3D rectangular object shown in the image; and
  (4) identifying one or more positions in the image having a concentration of edge points located at a distance equivalent to one-half of the X-dimension of each 3D rectangular object shown in the image or one-half of the Y-dimension of each 3D rectangular object shown in the image, at least a portion of the one or more positions corresponding to X, Y coordinates of a center location of one of the multiple 3D rectangular objects shown in the image.

2. The computer-implemented method of claim 1, wherein detecting a plurality of edge points comprising the multiple 3D rectangular objects shown in the image via gradient evaluation comprises, for each row of pixels in the image:
  computing an X-direction gradient for each pixel in the row; and
  creating a ledger comprising an entry for each pixel for which the X-direction gradient exceeds a threshold value, each ledger entry including a location of a particular pixel for which the X-direction gradient exceeds the threshold value and a gradient sign associated with the particular pixel, wherein each pixel having a ledger entry comprises an edge point of the plurality of edge points.

3. The computer-implemented method of claim 2, wherein the gradient sign associated with each pixel having a ledger entry is indicative of one of a rising gradient and a falling gradient.

4. The computer-implemented method of claim 1, wherein detecting a plurality of edge points comprising the multiple 3D rectangular objects shown in the image via gradient evaluation comprises, for each column of pixels in the image:
  computing an Y-direction gradient for each pixel in the column; and
  creating a ledger comprising an entry for each pixel for which the Y-direction gradient exceeds a threshold value, each ledger entry including a location of a particular pixel for which the Y-direction gradient exceeds the threshold value and a gradient sign associated with the particular pixel, wherein each pixel having a ledger entry comprises an edge point of the plurality of edge points.

5. The computer-implemented method of claim 4, wherein the gradient sign associated with each pixel having a ledger entry is indicative of one of a rising gradient and a falling gradient.

6. The computer-implemented method of claim 3, wherein for each row of pixels in the image, incrementing a frequency of distances between edge points of a first portion of the plurality of edge points to determine the X-dimension for each 3D rectangular object shown in the image comprises:
  for each individual pixel in a particular row that has a gradient sign indicative of a rising gradient, determining a distance from the individual pixel to each pixel to the right thereof in the X-direction that has a gradient sign indicative of a falling gradient;
  accumulating the distances in a one-dimensional histogram; and
  identifying a highest peak value in the one-dimensional histogram, the highest peak value being indicative of the X-dimension for the 3D rectangular objects shown in the image.

7. The computer-implemented method of claim 5, wherein for each column of pixels in the image, incrementing a frequency of distances between edge points of a second portion of the plurality of edge points to determine the Y-dimension for each 3D rectangular object shown in the image comprises:
  for each individual pixel in a particular column that has a gradient sign indicative of a rising gradient, determining a distance from the individual pixel to each pixel below the pixel in the Y-direction that has a gradient sign indicative of a falling gradient;
  accumulating the distances in a one-dimensional histogram; and
  identifying a highest peak value in the one-dimensional histogram, the highest peak value being indicative of the Y-dimension for the 3D rectangular objects shown in the image.

8. The computer-implemented method of claim 3, wherein identifying one or more positions in the image having a concentration of edge points located at a distance equivalent to one-half of the X-dimension of each 3D rectangular object shown in the image or one-half of the Y-dimension of each 3D rectangular object shown in the image comprises:
  creating a two-dimensional histogram having a plurality of bins, each bin corresponding to X,Y coordinates of one of the plurality of pixels comprising the image;
  for each pixel in each row of pixels having a ledger entry and a gradient sign indicative of a rising gradient, incrementing a count of all bins of the plurality of bins that are located to the right of the particular pixel in the X-direction that have a location at a distance equivalent to one-half of the X-dimension of each 3D rectangular object shown in the image;
  for each pixel in each row of pixels having a ledger entry and a gradient sign indicative of a falling gradient, incrementing a count of all bins of the plurality of bins that are located to the left of the particular pixel in the X-direction that have a location at the distance equivalent to one-half of the X-dimension of each 3D rectangular object shown in the image;
  for each pixel in each column of pixels having a ledger entry and a gradient sign indicative of a rising gradient, incrementing a count of all bins of the plurality of bins that are located below the pixel in the Y-direction that have a location at a distance equivalent to one-half of the Y-dimension of each 3D rectangular object shown in the image; and
  for each pixel in each column of pixels having a ledger entry and a gradient sign indicative of a falling gradient, incrementing a count of all bins of the plurality of bins that are located above the pixel in the Y-direction that have a location at the distance equivalent to one-half of the Y-dimension of each 3D rectangular object shown in the image, wherein each peak in the two-dimensional histogram that exceeds a threshold height corresponds to X, Y coordinates of a center location of one of the multiple 3D rectangular objects shown in the image.

9. The computer-implemented method of claim 1, further comprising providing the X-dimensions, Y-dimensions, and X,Y coordinates of the center locations for the multiple 3D rectangular objects shown in the image to a computing component configured to facilitate removal of the 3D rectangular objects from the surface.

10. One or more non-transitory computer storage media storing computer-useable instructions that, when used by at least one computing device, cause the at least one computing device to perform a method for locating boxes arranged in a plurality of layers on a pallet, each of the boxes having substantially equivalent X, Y, and Z dimensions as other boxes arranged on the pallet, the method comprising:
  obtaining a two-dimensional, overhead image of the pallet, the image having a plurality of pixels arranged in rows and columns and showing a top layer of boxes of the plurality of layers of boxes;
  detecting a plurality of edge points for the boxes comprising the top layer of boxes via gradient evaluation;
  for each row of pixels in the image, incrementing a frequency of distances between edge points of a first portion of the plurality of edge points to determine the X-dimension for each box comprising the top layer of boxes;
  for each column of pixels in the image, incrementing a frequency of distances between edge points of a second portion of the plurality of edge points to determine the Y-dimension for each box comprising the top layer of boxes; and
  identifying one or more positions in the image having a concentration of edge points located at a distance equivalent to one-half of the X-dimension of each box comprising the top layer of boxes or one-half of the Y-dimension of each box comprising the top layer of boxes, at least a portion of the one or more positions corresponding to the X, Y coordinates of a center location of one of the boxes comprising the top layer of boxes.

11. The one or more non-transitory computer storage media of claim 10, wherein detecting a plurality of edge points for the boxes comprising the top layer of boxes via gradient evaluation comprises, for each row of pixels in the image:
  computing an X-direction gradient for each pixel in the row; and
  creating a ledger comprising an entry for each pixel for which the X-direction gradient exceeds a threshold value, each ledger entry including a location of a particular pixel for which the X-direction gradient exceeds the threshold value and a gradient sign associated with the particular pixel,
  wherein each pixel having a ledger entry comprises an edge point of the plurality of edge points.

12. The one or more non-transitory computer storage media of claim 11, wherein the gradient sign associated with each pixel having a ledger entry is indicative of one of a rising gradient and a falling gradient.

13. The one or more non-transitory computer storage media of claim 10, wherein detecting a plurality of edge points for the boxes comprising the top layer of boxes via gradient evaluation comprises, for each column of pixels in the image:
  computing an Y-direction gradient for each pixel in the column; and
  creating a ledger comprising an entry for each pixel for which the Y-direction gradient exceeds a threshold value, each ledger entry including a location of a particular pixel for which the Y-direction gradient exceeds the threshold value and a gradient sign associated with the particular pixel,
  wherein each pixel having a ledger entry comprises an edge point of the plurality of edge points.

14. The one or more non-transitory computer storage media of claim 13, wherein the gradient sign associated with each pixel having a ledger entry is indicative of one of a rising gradient and a falling gradient.

15. The one or more non-transitory computer storage media of claim 12, wherein for each row of pixels in the image, incrementing a frequency of distances between edge points of a first portion of the plurality of edge points to determine the X-dimension for each box comprising the top layer of boxes comprises:
  for each individual pixel in a particular row that has a gradient sign indicative of a rising gradient, determining a distance from the individual pixel to each pixel to the right thereof in the X-direction that has a gradient sign indicative of a falling gradient;
  accumulating the distances in a one-dimensional histogram; and
  identifying a highest peak value in the one-dimensional histogram, the highest peak value being indicative of the X-dimension for each box comprising the top layer of boxes.

16. The one or more non-transitory computer storage media of claim 14, wherein for each column of pixels in the image, incrementing a frequency of distances between edge points of a second portion of the plurality of edge points to determine the Y-dimension for each box comprising the top layer of boxes:
  for each individual pixel in a particular column that has a gradient sign indicative of a rising gradient, determining a distance from the individual pixel to each pixel below the pixel in the Y-direction that has a gradient sign indicative of a falling gradient;
  accumulating the distances in a one-dimensional histogram; and
  identifying a highest peak value in the one-dimensional histogram, the highest peak value being indicative of the Y-dimension for each box comprising the top layer of boxes.

17. The one or more non-transitory computer storage media of claim 13, wherein identifying one or more positions in the image having a concentration of edge points located at a distance equivalent to one-half of the X-dimension of each box comprising the top layer of boxes or one-half of the Y-dimension of each box comprising the top layer of boxes comprises:
  creating a two-dimensional histogram having a plurality of bins, each bin corresponding to X,Y coordinates of one of the plurality of pixels comprising the image;
  for each particular pixel in each row of pixels having a ledger entry and a gradient sign indicative of a rising gradient, incrementing a count of all bins of the plurality of bins that are located to the right of the particular pixel in the X-direction that have a location at a distance equivalent to one-half of the X-dimension of each box comprising the top layer of boxes;

for each particular pixel in each row of pixels having a ledger entry and a gradient sign indicative of a falling gradient, incrementing a count of all bins of the plurality of bins that are located to the left of the particular pixel in the X-direction that have a location at the distance equivalent to one-half of the X-dimension of each box comprising the top layer of boxes;

for each particular pixel in each column of pixels having a ledger entry and a gradient sign indicative of a rising gradient, incrementing a count of all bins of the plurality of bins that are located below the particular pixel in the Y-direction that have a location at a distance equivalent to one-half of the Y-dimension of each box comprising the top layer of boxes; and for each particular pixel in each column of pixels having a ledger entry and a gradient sign indicative of a falling gradient, incrementing a count of all bins of the plurality of bins that are located above the particular pixel in the Y-direction that have a location at the distance equivalent to one-half of the Y-dimension of each box comprising the top layer of boxes, wherein each peak in the two-dimensional histogram that exceed a threshold height corresponds to X,Y coordinates of a center location of one of the boxes comprising the top layer of boxes.

18. The one or more non-transitory computer storage media of claim 10, wherein the method further comprises providing the X-dimensions, Y-dimensions, and X, Y coordinates of the center locations for each box comprising the top layer of boxes to a computing component configured to facilitate removal of the boxes from the pallet.

19. A computer-method being performed by one or more computing devices including at least one processor, the method for locating boxes arranged in a plurality of layers on a pallet, each of the boxes having substantially equivalent X, Y, and Z dimensions as other boxes arranged on the pallet, the method comprising:

obtaining a two-dimensional, overhead image, the image having a plurality of pixels arranged in rows and columns and showing a top layer of boxes of the plurality of layers of boxes, the boxes of the top layer of boxes collectively providing a substantially planar top surface;

detecting a plurality of edge points for the boxes comprising the top layer of boxes via gradient evaluation;

for each row of pixels in the image, incrementing a frequency of distances between edge points of a first portion of the plurality of edge points to determine the X-dimension for each box comprising the top layer of boxes;

for each column of pixels in the image, incrementing a frequency of distances between edge points of a second portion of the plurality of edge points to determine the Y-dimension for each box comprising the top layer of boxes; and identifying one or more positions in the image having a concentration of edge points located at a distance equivalent to one-half of the X-dimension of each box comprising the top layer of boxes or one-half of the Y-dimension of each box comprising the top layer of boxes, at least a portion of the one or more positions corresponding to the X, Y coordinates of a center location of one of the boxes comprising the top layer of boxes.

20. The computer-implemented method of claim 19, further comprising providing the X-dimensions, Y-dimensions, and X,Y coordinates of the center locations for each box comprising the top layer of boxes to a computing component configured to facilitate removal of the boxes from the pallet.

* * * * *